(12) United States Patent
Hirano et al.

(10) Patent No.: US 11,046,581 B2
(45) Date of Patent: Jun. 29, 2021

(54) POLYCRYSTALLINE CUBIC BORON NITRIDE AND METHOD FOR MANUFACTURING THE SAME

(71) Applicant: SUMITOMO ELECTRIC HARDMETAL CORP., Itami (JP)

(72) Inventors: Tsutomu Hirano, Itami (JP); Satoru Kukino, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 16/652,229

(22) PCT Filed: Jun. 18, 2019

(86) PCT No.: PCT/JP2019/024120
§ 371 (c)(1),
(2) Date: Mar. 30, 2020

(87) PCT Pub. No.: WO2019/244894
PCT Pub. Date: Dec. 26, 2019

(65) Prior Publication Data
US 2020/0247673 A1 Aug. 6, 2020

(30) Foreign Application Priority Data

Jun. 18, 2018 (JP) .............................. JP2018-115432

(51) Int. Cl.
| | | |
|---|---|---|
| *C04B 35/5831* | (2006.01) | |
| *C01B 21/064* | (2006.01) | |
| *B23B 27/14* | (2006.01) | |
| *B23P 15/28* | (2006.01) | |

(52) U.S. Cl.
CPC .......... *C01B 21/0648* (2013.01); *B23B 27/14* (2013.01); *B23P 15/28* (2013.01); *C01B 21/064* (2013.01); *C04B 35/5831* (2013.01); *C01P 2002/60* (2013.01); *C01P 2002/72* (2013.01); *C01P 2002/76* (2013.01); *C01P 2002/88* (2013.01); *C01P 2004/03* (2013.01); *C01P 2006/80* (2013.01); *C01P 2006/90* (2013.01)

(58) Field of Classification Search
CPC ... C04B 35/5831; B23B 27/14; C01B 21/064; C01B 21/0648; B23P 15/28; C01P 2004/03; C01P 2002/88; C01P 2002/76; C01P 2002/72; C01P 2002/60; C01P 2002/90; C01P 2006/80; C01P 2006/90
USPC ......... 423/290; 51/307, 293; 501/96.1, 96.4; 428/698; 407/119
See application file for complete search history.

(56) References Cited

U.S. PATENT DOCUMENTS

| | | | |
|---|---|---|---|
| 4,188,194 A | | 2/1980 | Corrigan |
| 6,316,094 B1 * | | 11/2001 | Fukaya ............... C04B 35/5831 428/323 |
| 2016/0052828 A1 * | | 2/2016 | Andersin ........... C04B 35/6261 29/557 |
| 2017/0369314 A1 * | | 12/2017 | Zhang ............... C04B 35/62675 |
| 2018/0029942 A1 | | 2/2018 | Ishida et al. |
| 2018/0265416 A1 | | 9/2018 | Ishida et al. |
| 2019/0118344 A1 * | | 4/2019 | Dues ........................ B22F 3/14 |

FOREIGN PATENT DOCUMENTS

| | | |
|---|---|---|
| JP | S49-013209 A | 2/1974 |
| JP | S54-033510 A | 3/1979 |
| JP | H11-246271 A | 9/1999 |
| JP | H11-335175 A | 12/1999 |
| JP | 2014-080323 A | 5/2014 |
| WO | WO-2016/125548 A1 | 8/2016 |
| WO | WO-2016/129328 A1 | 8/2016 |

OTHER PUBLICATIONS

Vincent et al., Design of Highly Dense Boron Nitride by the Combination of Spray-Pyrolysis of Borazine and Additive-Free Sintering of Derived Ultrafine powders, Chemistry of Materials article, 2009, vol. 21, pp. 2920-2929.

* cited by examiner

*Primary Examiner* — Elizabeth D Wood
(74) *Attorney, Agent, or Firm* — Faegre Drinker Biddle & Reath LLP (57) ABSTRACT

The polycrystalline cubic boron nitride contains a cubic boron nitride at a content greater than or equal to 98.5% by volume, and has an area rate S1 of crystal grains, the crystal grains having an equivalent circle diameter greater than or equal to 1 μm, less than or equal to 20 area % at a cross section of the polycrystalline cubic boron nitride as observed with a scanning electron microscope at a magnification of 10,000.

12 Claims, 5 Drawing Sheets

POLYCRYSTALLINE CUBIC BORON NITRIDE AND METHOD FOR MANUFACTURING THE SAME

TECHNICAL FIELD

The present disclosure relates to a polycrystalline cubic boron nitride and a method for manufacturing the same. This application claims priority based on Japanese Patent Application No. 2018-115432 that was filed on Jun. 18, 2018. All the descriptions in the Japanese patent application are incorporated herein by reference.

BACKGROUND ART

Cubic boron nitrides (hereinafter also referred to as "cBNs") have a hardness second to that of diamond, and are excellent in thermal stability and chemical stability. In addition, since cBNs are more stable to iron-based materials than diamond is, cubic boron nitride sintered bodies have been used as a processing tool for iron-based materials.

The cubic boron nitride sintered bodies that have been used contain about 10 to 40% by volume of a binder. However, the binder has been a cause of reducing the strength and thermal diffusivity of the sintered bodies. In particular, when the cubic boron nitride sintered bodies are used for cutting iron-based materials at high speed, there is a tendency that the thermal load increases, the cutting edge is easily chipped or cracked, and the tool life is shortened.

In order to solve these problems, a method for producing a cubic boron nitride sintered body containing no binder has been developed. In the method, no binder is used, and a hexagonal boron nitride is directly converted into a cubic boron nitride under ultra-high pressure and ultra-high temperature without using a catalyst, and simultaneously sintered.

In Japanese Patent Laying-Open No. 11-246271 (PTL 1), a technique is disclosed in which a low crystalline hexagonal boron nitride is directly converted into a cubic boron nitride sintered body under ultra-high temperature and ultra-high pressure, and sintered to obtain a cubic boron nitride sintered body. The cubic boron nitride sintered body has a high hardness because the cubic boron nitride sintered body contains cubic boron nitride grains having a small grain size. The cubic boron nitride sintered body, however, tends to have a low toughness.

In order to ensure the toughness of the polycrystalline cubic boron nitride, a technique has been developed in which the cubic boron nitride sintered body is made to contain a coarse plate-like structure having a large major axis. According to this technique, the plate-like structure can prevent a fine crack from being developed at the occurrence of the crack.

In International Publication No. 2016/129328 (PTL 2), a technique is disclosed in which a hexagonal boron nitride powder having a grain size less than or equal to 0.5 μm is directly converted into a cubic boron nitride and a wurtzite boron nitride under ultra-high pressure and ultra-high temperature, and sintered to obtain a polycrystalline cubic boron nitride containing a plate-like structure together with a fine cubic boron nitride.

In International Publication No. 2016/125548 (PTL 3), a technique is disclosed in which a coarse hexagonal boron nitride and a non-hexagonal boron nitride or fine hexagonal boron nitride are directly converted into a cubic boron nitride under ultra-high pressure and ultra-high temperature, and sintered to obtain a polycrystalline cubic boron nitride containing a plate-like cubic boron nitride together with a fine cubic boron nitride.

CITATION LIST

Patent Literature

PTL 1: Japanese Patent Laying-Open No. 11-246271
PTL 2: International Publication No. 2016/129328
PTL 3: International Publication No. 2016/125548

SUMMARY OF INVENTION

The present inventors investigated the cause of the sudden chipping that occurs in the conventional polycrystalline cubic boron nitride, and found that the presence of coarse grains in the sintered body structure deteriorates homogeneity of the sintered body structure, so that the strength and toughness are deteriorated. Therefore, the present inventors assumed that this sudden chipping could be reduced by reducing the coarse grains in the sintered body structure, and as a result of intensive studies, completed the polycrystalline cubic boron nitride according to the present embodiment as follows.

[1] The polycrystalline cubic boron nitride according to an aspect of the present disclosure is a polycrystalline cubic boron nitride containing a cubic boron nitride at a content greater than or equal to 98.5% by volume, the polycrystalline cubic boron nitride having an area rate S1 of crystal grains, the crystal grains having an equivalent circle diameter greater than or equal to 1 μm, less than or equal to 20 area % at a cross section of the polycrystalline cubic boron nitride as observed with a scanning electron microscope at a magnification of 10,000.

[2] The method for manufacturing a polycrystalline cubic boron nitride according to an aspect of the present disclosure is a method for manufacturing the polycrystalline cubic boron nitride according to [1] described above, the method including a step of preparing a hexagonal boron nitride powder; and a heating and pressurizing step of heating and pressurizing the hexagonal boron nitride powder to a temperature greater than or equal to 1900° C. and less than or equal to 2400° C. and to a pressure greater than or equal to 8 GPa, with the temperature and the pressure not passing through a temperature and a pressure in a stable region of a wurtzite boron nitride, wherein the temperature and the pressure in the stable region of the wurtzite boron nitride simultaneously satisfy Formulae 1 and 2 shown below:

$$P \geq -0.0037T + 11.301 \quad \text{Formula 1; and}$$

$$P \leq -0.085T + 117 \quad \text{Formula 2}$$

wherein T represents the temperature in ° C. and P represents the pressure in GPa.

DETAILED DESCRIPTION

Problems to be Solved by the Present Disclosure

The polycrystalline cubic boron nitrides according to PTL 2 and 3 are mainly used for cutting materials that are relatively easy to cut, such as sintered alloys and cast iron. Meanwhile, in recent years, difficult-to-cut materials such as titanium-based alloys and cobalt-chromium alloys have been used in industrial fields of aircraft and medicine, and the demand for high-efficiency processing of these difficult-to-cut materials has increased.

The inventors have found a new problem that while the polycrystalline cubic boron nitrides according to PTL 2 and 3 that are used for high-efficiency processing of the difficult-to-cut materials demonstrate excellent wear resistance, the tool life tends to vary.

Therefore, an object of the present invention is to provide a polycrystalline cubic boron nitride that, when used as a tool, can stably achieve a long tool life without a variation in the tool life even in high-efficiency processing of difficult-to-cut materials.

Advantageous Effects of the Present Disclosure

The polycrystalline cubic boron nitride according to the above aspect, when used as a tool, can stably achieve a long tool life without a variation in the tool life even in high-efficiency processing of difficult-to-cut materials.

DESCRIPTION OF EMBODIMENTS

First, embodiments of the present disclosure will be listed and described.

(1) The polycrystalline cubic boron nitride according to an aspect of the present disclosure is a polycrystalline cubic boron nitride containing a cubic boron nitride at a content greater than or equal to 98.5% by volume, the polycrystalline cubic boron nitride having an area rate S1 of crystal grains, the crystal grains having an equivalent circle diameter greater than or equal to 1 μm, less than or equal to 20 area % at a cross section of the polycrystalline cubic boron nitride as observed with a scanning electron microscope at a magnification of 10,000.

When used as a tool, the polycrystalline cubic boron nitride can stably achieve a long tool life without a variation in the tool life even in high-efficiency processing of difficult-to-cut materials.

(2) The crystal grains preferably have a median diameter d50 of the equivalent circle diameter greater than or equal to 0.1 μm and less than or equal to 0.5 μm. With this median diameter, the wear resistance of the polycrystalline cubic boron nitride is improved.

(3) The median diameter d50 is preferably greater than or equal to 0.15 μm and less than or equal to 0.35 μm. With this median diameter, the wear resistance of the polycrystalline cubic boron nitride is further improved.

(4) The area rate S1 is preferably less than or equal to 15 area %. With this area rate, the tool life of the polycrystalline cubic boron nitride is further improved.

(5) The area rate S1 is preferably less than or equal to 10 area %. With this area rate, the tool life of the polycrystalline cubic boron nitride is further improved.

(6) The polycrystalline cubic boron nitride preferably has an area rate S2 of grains, the grains having an aspect ratio greater than or equal to 4, less than or equal to 5 area % at a cross section of the polycrystalline cubic boron nitride as observed with a scanning electron microscope at a magnification of 10,000. With this area rate, the tool life of the polycrystalline cubic boron nitride is further improved.

(7) The area rate S2 is preferably less than or equal to 3 area %. With this area rate, the tool life of the polycrystalline cubic boron nitride is further improved.

(8) The method for manufacturing a polycrystalline cubic boron nitride according to an aspect of the present disclosure is a method for manufacturing the polycrystalline cubic boron nitride according to any of (1) to (7) described above, the method including a step of preparing a hexagonal boron nitride powder; and a heating and pressurizing step of heating and pressurizing the hexagonal boron nitride powder to a temperature greater than or equal to 1900° C. and less than or equal to 2400° C. and to a pressure greater than or equal to 8 GPa, with the temperature and the pressure not passing through a temperature and a pressure in a stable region of a wurtzite boron nitride, wherein the temperature and the pressure in the stable region of the wurtzite boron nitride simultaneously satisfy Formulae 1 and 2 shown below:

$$P \geq -0.0037T + 11.301 \quad \text{Formula 1; and}$$

$$P \leq -0.085T + 117 \quad \text{Formula 2}$$

wherein T represents the temperature in ° C. and P represents the pressure in GPa.

When used as a tool, the polycrystalline cubic boron nitride that is produced by the method can stably achieve a long tool life without a variation in the tool life even in high-efficiency processing of difficult-to-cut materials.

(9) The method preferably includes a pretreatment step before the heating and pressurizing step, the pretreatment step being is a step of pressurizing the hexagonal boron nitride powder to a pressure greater than or equal to 0.5 GPa and less than or equal to 6 GPa at a temperature maintained in a range greater than or equal to −50° C. and less than or equal to 100° C.

By performing the pretreatment step, the gap in the hexagonal boron nitride powder can be compressed, and unnecessary gas present in the hexagonal boron nitride powder can be discharged out of the system. Therefore, it is possible to prevent quality degradation due to a chemical reaction between the gas and the hexagonal boron nitride powder.

By performing the pretreatment step, it is possible to increase the density of the hexagonal boron nitride powder to such an extent that the outer shape hardly changes even when the hexagonal boron nitride powder is further pressurized. Since the heating and pressurizing step can be performed in the state, the polycrystalline cubic boron nitride can be manufactured stably.

(10) The method preferably includes a temperature and pressure holding step after the heating and pressurizing step, the temperature and pressure holding step being a step of holding the polycrystalline cubic boron nitride produced by the heating and pressurizing step under conditions of a temperature greater than or equal to 1900° C. and less than or equal to 2400° C. and a pressure greater than or equal to 8 GPa for greater than or equal to 10 minutes. According to this method, the produced polycrystalline cubic boron nitride can achieve a longer tool life.

(11) It is preferable that the heating and pressurizing step include a first heating and pressurizing step in which a value of a ratio $\Delta P1/\Delta T1$ is constant, the ratio $\Delta P1/\Delta T1$ being a ratio between an increase amount $\Delta T1$ of the temperature T and an increase amount $\Delta P1$ of the pressure P for the $\Delta T1$, and a second heating and pressurizing step in which a value of a ratio $\Delta P2/\Delta T2$ is constant, the ratio $\Delta P2/\Delta T2$ being a ratio between an increase amount $\Delta T2$ of the temperature T and an increase amount $\Delta P2$ of the pressure P for the $\Delta T2$, that the first heating and pressurizing step be followed by the second heating and pressurizing step, and that the value $\Delta P2/\Delta T2$ be greater than the value $\Delta P1/\Delta T1$.

According to this method, it is possible to reliably avoid passage of the heating and pressurizing step through the stable region of the wurtzite boron nitride.

(12) It is preferable that the first heating and pressurizing step be performed, until at least a temperature and a pressure that satisfy conditions represented by Formula 3 shown below are reached, at a temperature and a pressure that satisfy conditions represented by Formula 4 shown below.

$$P=-0.085T+117 \quad \text{Formula 3}$$

$$P<0.0051T-0.1275 \quad \text{Formula 4}$$

According to this method, it is possible to reliably avoid passage of the heating and pressurizing step through the stable region of the wurtzite boron nitride.

(13) It is preferable that the first heating and pressurizing step be performed at a temperature and a pressure that satisfy conditions represented by Formulae 5 and 6 shown below.

$$P<-0.085T+117 \quad \text{Formula 5}$$

$$P<0.0051T-0.1275 \quad \text{Formula 6}$$

According to this method, it is possible to reliably avoid passage of the heating and pressurizing step through the stable region of the wurtzite boron nitride.

DETAILED DESCRIPTION OF EMBODIMENTS

The polycrystalline cubic boron nitride and the method for manufacturing the same according to an embodiment of the present disclosure will be described below with reference to the drawings. The present disclosure is not limited to these examples, is shown by the claims, and is intended to include all modifications within the scope and meaning equivalent to the claims.

Embodiment 1: Polycrystalline Cubic Boron Nitride

Figure 1:
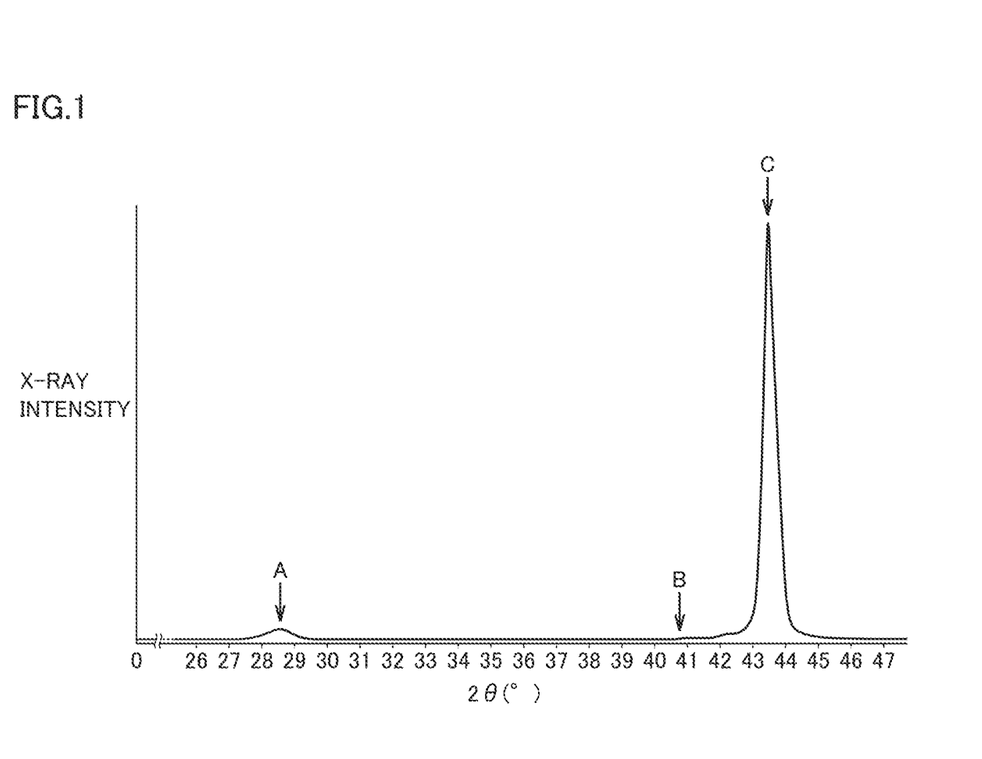
FIG. 1 is an X-ray spectrum of the polycrystalline cubic boron nitride according to an embodiment of the present disclosure.
Figure 2:
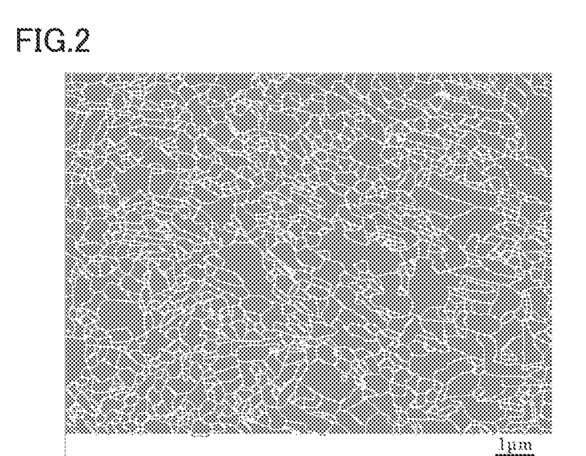
FIG. 2 is a SEM image of the polycrystalline cubic boron nitride according to an embodiment of the present disclosure.
Figure 3:
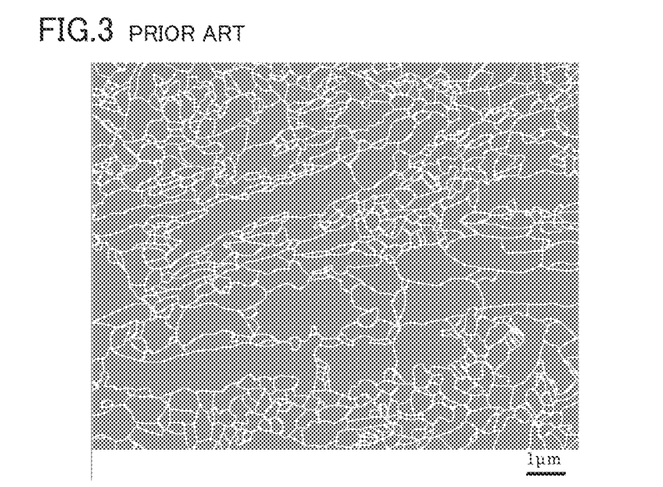
FIG. 3 is a SEM image of a conventional polycrystalline cubic boron nitride.
Figure 7:
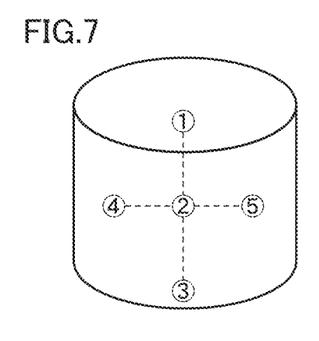
FIG. 7 is a diagram for illustrating measurement points of the polycrystalline cubic boron nitride.
Figure 8:
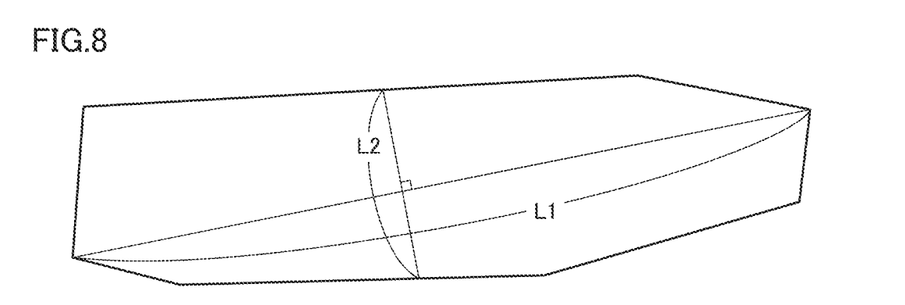
FIG. 8 is a diagram for illustrating an aspect ratio of a crystal grain.

The polycrystalline cubic boron nitride according to an embodiment of the present disclosure will be described with reference to FIGS. 1 to 3, 7, and 8. FIG. 1 is an X-ray spectrum of the polycrystalline cubic boron nitride according to an embodiment of the present disclosure. FIG. 2 is a SEM image of the polycrystalline cubic boron nitride according to an embodiment of the present disclosure. FIG. 3 is a SEM image of a conventional polycrystalline cubic boron nitride. FIG. 7 is a diagram for illustrating measurement points of the polycrystalline cubic boron nitride. FIG. 8 is a diagram for illustrating an aspect ratio of a crystal grain.

<Polycrystalline Cubic Boron Nitride>

The polycrystalline cubic boron nitride according to the present embodiment contains a cubic boron nitride at a content greater than or equal to 98.5% by volume, and has an area rate S1 of crystal grains, the crystal grains having an equivalent circle diameter greater than or equal to 1 μm, less than or equal to 20% at a cross section of the polycrystalline cubic boron nitride as observed with a scanning electron microscope at a magnification of 10,000.

The polycrystalline cubic boron nitride according to the present embodiment is a sintered body, but is referred to as "polycrystalline" because the sintered body is often intended to contain a binder.

When used as a tool, the polycrystalline cubic boron nitride according to the present embodiment can stably achieve a long tool life without a variation in the tool life even in high-efficiency processing of difficult-to-cut materials. The reason is presumably as (i) and (ii) shown below.

(i) The polycrystalline cubic boron nitride according to the present embodiment contains a cubic boron nitride at a content greater than or equal to 98.5% by volume, and contains substantially neither a binder, a sintering aid, a catalyst, nor the like. As a result, grains of the cubic boron nitride are firmly bonded together, and the strength and thermal diffusivity of the polycrystalline cubic boron nitride are improved. Therefore, the polycrystalline cubic boron nitride can achieve a long tool life even in high-efficiency processing of difficult-to-cut materials.

(ii) The polycrystalline cubic boron nitride according to the present embodiment has an area rate S1 of crystal grains, the crystal grains having an equivalent circle diameter greater than or equal to 1 μm, less than or equal to 20% at a cross section of the polycrystalline cubic boron nitride. As a result, the rate of the coarse grains in the polycrystalline cubic boron nitride is reduced. Therefore, in the polycrystalline cubic boron nitride, the homogeneity of the sintered body structure is improved, so that the strength and toughness of the polycrystalline cubic boron nitride are improved, and the polycrystalline cubic boron nitride can achieve a long tool life even in high-efficiency processing of difficult-to-cut materials.

<Composition>

The polycrystalline cubic boron nitride contains a cubic boron nitride at a content greater than or equal to 98.5% by volume. As a result, the polycrystalline cubic boron nitride has an excellent hardness, and is excellent in thermal stability and chemical stability.

The polycrystalline cubic boron nitride may contain one or both of a compressed hexagonal boron nitride and a wurtzite boron nitride at a total content less than or equal to 1.5% by volume in addition to a cubic boron nitride as long as the effects of the present embodiment are exhibited. Here, the word "compressed hexagonal boron nitride" means a hexagonal boron nitride having a crystal structure similar to that of a normal hexagonal boron nitride, and having a plane spacing along the c-axis smaller than that of a normal hexagonal boron nitride (0.333 nm).

The polycrystalline cubic boron nitride according to the present embodiment may contain inevitable impurities as long as the effects of the present embodiment are exhibited. Examples of the inevitable impurities include hydrogen, oxygen, carbon, and metal elements such as alkali metal elements (lithium (Li), sodium (Na), potassium (K), and the like) and alkaline earth metal elements (calcium (Ca), magnesium (Mg), and the like). When the polycrystalline cubic boron nitride contains the inevitable impurities, the content of the inevitable impurities is preferably less than or equal to 0.1% by volume. The content of the inevitable impurities can be measured by secondary ion mass spectrometry (SIMS).

The polycrystalline cubic boron nitride contains substantially neither a binder, a sintering aid, a catalyst, nor the like. As a result, the strength and thermal diffusivity of the polycrystalline cubic boron nitride are improved.

The content rate of the cubic boron nitride in the polycrystalline cubic boron nitride is preferably greater than or equal to 98.5% by volume and less than or equal to 100% by volume, and more preferably greater than or equal to 99% by volume and less than or equal to 100% by volume.

The total content rate of the compressed hexagonal boron nitride and the wurtzite boron nitride in the polycrystalline cubic boron nitride is preferably greater than or equal to 0% by volume and less than or equal to 1.5% by volume, more preferably greater than or equal to 0% by volume and less than or equal to 1% by volume, and most preferably 0% by volume. That is, it is most preferable that the polycrystalline cubic boron nitride contain neither the compressed hexagonal boron nitride nor the wurtzite boron nitride.

The content rate of the compressed hexagonal boron nitride in the polycrystalline cubic boron nitride is preferably greater than or equal to 0% by volume and less than or equal to 1.5% by volume, more preferably greater than or equal to 0% by volume and less than or equal to 1% by volume, and most preferably 0% by volume. That is, it is most preferable that the polycrystalline cubic boron nitride contain no compressed hexagonal boron nitride.

The content rate of the wurtzite boron nitride in the polycrystalline cubic boron nitride is preferably greater than or equal to 0% by volume and less than or equal to 1.5% by volume, more preferably greater than or equal to 0% by volume and less than or equal to 1% by volume, and most preferably 0% by volume. That is, it is most preferable that the polycrystalline cubic boron nitride contain no wurtzite boron nitride.

The content rate (% by volume) of each of the cubic boron nitride, compressed hexagonal boron nitride, and wurtzite boron nitride in the polycrystalline cubic boron nitride can be measured by an X-ray diffraction method. A specific measurement method is as follows.

The polycrystalline cubic boron nitride is cut with a diamond grindstone electrodeposition wire, and the cut surface is taken as an observation surface.

An X-ray spectrum of the cut surface of the polycrystalline cubic boron nitride is obtained using an X-ray diffractometer ("MiniFlex600" (trade name) manufactured by Rigaku Corporation). The conditions of the X-ray diffractometer at this time are as follows, for example.

Characteristic X-ray: Cu-Kα (wavelength 1.54 Å)
Tube voltage: 45 kV
Tube current: 40 mA
Filter: Multilayer mirror
Optical system: Focusing method
X-ray diffraction method: θ-2θ method In the obtained X-ray spectrum, the following peak intensity A, peak intensity B, and peak intensity C are measured.

Peak intensity A: The peak intensity of the compressed hexagonal boron nitride excluding the background from the peak intensity near the diffraction angle 2θ=28.5° (the peak intensity indicated by A in FIG. 1).

Peak intensity B: The peak intensity of the wurtzite boron nitride excluding the background from the peak intensity near the diffraction angle 2θ=40.8° (the peak intensity indicated by B in FIG. 1).

Peak intensity C: The peak intensity of the cubic boron nitride excluding the background from the peak intensity near the diffraction angle 2θ=43.5° (the peak intensity indicated by C in FIG. 1).

The content rate of the compressed hexagonal boron nitride is determined by calculating the value of peak intensity A/(peak intensity A+peak intensity B+peak intensity C). The content rate of the wurtzite boron nitride is determined by calculating the value of peak intensity B/(peak intensity A+peak intensity B+peak intensity C). The content rate of the polycrystalline cubic boron nitride is determined by calculating the value of peak intensity C/(peak intensity A+peak intensity B+peak intensity C). Because the compressed hexagonal boron nitride, wurtzite boron nitride, and cubic boron nitride all have almost the same electronic weight, the ratio among the above X-ray peak intensities can be regarded as the volume ratio in the polycrystalline cubic boron nitride.

<Crystal Grains>

(Area Rate S1 of Crystal Grains Having Equivalent Circle Diameter Greater than or Equal to 1 μm)

The polycrystalline cubic boron nitride contains a plurality of crystal grains including crystal grains of the cubic boron nitride, and optionally containing crystal grains of the compressed hexagonal boron nitride and crystal grains of wurtzite boron nitride. The polycrystalline cubic boron nitride has an area rate S1 of crystal grains, the crystal grains having an equivalent circle diameter greater than or equal to 1 μm (hereinafter also referred to as "area rate S1"), less than or equal to 20% at a cross section of the polycrystalline cubic boron nitride as observed with a scanning electron microscope at a magnification of 10,000. Here, the word "equivalent circle diameter" means a diameter of a circle having the same area as that of the crystal grains.

In the polycrystalline cubic boron nitride, the content rate of the coarse grains having an equivalent circle diameter greater than or equal to 1 μm is reduced. Therefore, in the polycrystalline cubic boron nitride, the homogeneity of the sintered body structure is improved, so that the strength and toughness are improved, and the polycrystalline cubic boron nitride can achieve a long tool life even in high-efficiency processing of difficult-to-cut materials.

The homogeneity of the crystal structure of the polycrystalline cubic boron nitride according to the present embodiment can be confirmed, for example, by observing the cubic boron nitride with a SEM (Scanning Electron Microscope). FIG. 2 is a SEM image of the polycrystalline cubic boron nitride according to an embodiment of the present disclosure. FIG. 3 is a SEM image of a conventional polycrystalline cubic boron nitride. FIGS. 2 and 3 are taken at the same observation magnification. By comparing these SEM images, it can be seen that the size and shape of the crystal grains are more homogeneous in FIG. 2 than in FIG. 3.

The area rate S1 of crystal grains having an equivalent circle diameter greater than or equal to 1 μm is preferably greater than or equal to 0 area % and less than or equal to 20 area %, more preferably greater than or equal to 0 area % and less than or equal to 15 area %, and still more preferably greater than or equal to 0 area % and less than or equal to 10 area %.

(Median Diameter d50)

The crystal grains preferably have a median diameter d50 of the equivalent circle diameter greater than or equal to 0.1 µm and less than or equal to 0.5 µm. Conventionally, it has been considered that cutting performance of a polycrystalline cubic boron nitride is improved as the crystal grain size is smaller. Therefore, the grain size of the crystal grains contained in the polycrystalline cubic boron nitride has been made small (for example, the average grain size is less than 100 nm). As a result, however, there has been a tendency for toughness to decrease. Meanwhile, in the polycrystalline cubic boron nitride according to the present embodiment, the grain size of the crystal grains is larger than that of conventional crystal grains, so that the toughness of the polycrystalline cubic boron nitride is improved, and the wear resistance is improved. The median diameter d50 of the equivalent circle diameter of the crystal grains is more preferably greater than or equal to 0.15 µm and less than or equal to 0.35 µm, and still more preferably greater than or equal to 0.2 µm and less than or equal to 0.3 µm.

(Area Rate S2 of Grains Having Aspect Ratio Greater than or Equal to 4)

The polycrystalline cubic boron nitride preferably has an area rate S2 of grains, the grains having an aspect ratio greater than or equal to 4 (hereinafter also referred to as "area rate S2"), less than or equal to 5 area % at a cross section of the polycrystalline cubic boron nitride as observed with a scanning electron microscope at a magnification of 10,000. In conventional polycrystalline cubic boron nitrides, the low toughness due to the small grain size is compensated by the presence of a plate-like structure in the cubic polycrystal. However, the plate-like structure suddenly falls from a cutting edge particularly during high-efficiency processing of difficult-to-cut materials to cause chipping of the cutting edge, so that the plate-like structure causes a variation and decrease in the tool life.

In the polycrystalline cubic boron nitride according to the present embodiment, the content rate of the grains having an aspect ratio greater than or equal to 4 is reduced. Therefore, in the polycrystalline cubic boron nitride, the sudden chipping of the cutting edge due to the grains having an aspect ratio greater than or equal to 4 hardly occurs, so that the polycrystalline cubic boron nitride can achieve a long tool life even in high-efficiency processing of difficult-to-cut materials.

The area rate S2 of grains having an aspect ratio greater than or equal to 4 is preferably greater than or equal to 0 area % and less than or equal to 5 area %, more preferably greater than or equal to 0 area % and less than or equal to 3 area %, and still more preferably greater than or equal to 0 area % and less than or equal to 2 area %.

(Measurement Method of Area Rate S1, Area Rate S2, and Median Diameter d50 of Equivalent Circle Diameter of Crystal Grains)

In the present description, the phrases "area rate S1 of crystal grains having an equivalent circle diameter greater than or equal to 1 µm", "area rate S2 of grains having an aspect ratio greater than or equal to 4", and "median diameter d50 of the equivalent circle diameter of the crystal grains" in the polycrystalline cubic boron nitride mean the value obtained by measuring the area rate S1, the area rate S2, and the median diameter d50 of the crystal grains at each of five arbitrarily selected measurement points and calculating the average value of the area rate S1, the area rate S2, and the median diameter d50, respectively.

For example, when the polycrystalline cubic boron nitride is cylindrical, the measurement points can be the five measurement points shown by numbers 1 to 5 in FIG. 7 (the two points near the top and bottom surfaces (the positions shown by numbers 1 and 3), the one point in the central portion (the position shown by number 2), and the two points near the side surface (the positions shown by numbers 4 and 5)).

When the polycrystalline cubic boron nitride is used as a part of a cutting tool, a portion of the polycrystalline cubic boron nitride is cut out by wire electric discharge machining, a diamond grindstone electrodeposition wire, or the like, the cut out cross section is CP (cross section polisher) processed, and five measurement points are arbitrarily set on the CP processed surface.

The method for measuring the area rate S1, the area rate S2, and the median diameter d50 of the equivalent circle diameter of the crystal grains at each measurement point will be specifically described below.

The polycrystalline cubic boron nitride is cut by wire electric discharge machining, a diamond grindstone electrodeposition wire, or the like so that the measurement point is exposed, and the cut surface is CP (cross section polisher) processed. The measurement point on the CP processed surface is observed using a SEM ("JSM-7500F" (trade name) manufactured by JEOL Ltd.) to obtain a SEM image. The size of the measurement visual field is 12 µm×15 µm, and the observation magnification is 10,000 times.

The aspect ratio of each of the crystal grains, the area of each of the crystal grains, and the distribution of the equivalent circle diameters of the crystal grains are calculated for each of the five SEM images using image processing software (Win Roof ver. 7.4.5) in a state where the crystal grains observed within the measurement visual field are separated from each other at a grain boundary. Here, the word "aspect ratio" means a value of a ratio of the major axis to the minor axis (major axis/minor axis) of the crystal grain in the cut surface. When the shape of the crystal grain is indefinite as shown in FIG. 8, the aspect ratio is calculated according to the following procedures (a) to (c) using image processing software.

(a) The longest line segment that can be drawn inside the crystal grains (so that both ends of the line segment are in contact with the grain boundary) (hereinafter also referred to as "first line segment") is determined, and the length L1 of the first line segment is measured.

(b) The longest line segment that is perpendicular to the first line segment and can be drawn inside the crystal grains (so that both ends of the line segment are in contact with the grain boundary) (hereinafter also referred to as "second line segment") is determined, and the length L2 of the second line segment is measured.

(c) A value of a ratio of the length L1 of the first line segment to the length L2 of the second line segment (L1/L2) is calculated. The value of (L1/L2) is taken as the aspect ratio.

From the aspect ratio of each of the crystal grains and the area of each of the crystal grains, an area rate S1 of the crystal grains having an equivalent circle diameter greater than or equal to 1 µm and an area rate S2 of the grains having an aspect ratio greater than or equal to 4 are calculated. From the distribution of the equivalent circle diameters of the crystal grains, a median diameter d50 is calculated. The area rate S1, the area rate S2, and the median diameter d50 are calculated using the area of the entire measurement visual field as a denominator.

<Application>

The polycrystalline boron nitride according to the present embodiment is preferably used in cutting tools, wear resistant tools, grinding tools, and the like. That is, it is preferable that the cutting tool, the wear resistant tool, and the grinding tool according to the present embodiment each include the polycrystalline boron nitride.

The whole of each of the cutting tool, the wear resistant tool, and the grinding tool according to the present embodiment may include the polycrystalline cubic boron nitride, or only a part of each tool (for example, a cutting edge part in the case of a cutting tool) may include the polycrystalline boron nitride. Furthermore, a coating film may be formed on the surface of each tool.

Examples of the cutting tool according to the present embodiment include drills, end mills, cutting edge exchangeable cutting tips for drills, cutting edge exchangeable cutting tips for end mills, cutting edge exchangeable cutting tips for milling, cutting edge exchangeable cutting tips for turning, metal saws, gear cutting tools, reamers, taps, and cutting tools.

Examples of the wear resistant tool according to the present embodiment include dies, scribers, scribing wheels, and dressers. Examples of the grinding tool according to the present embodiment include grinding stones.

Embodiment 2: Method for Manufacturing Polycrystalline Cubic Boron Nitride

Figure 4:
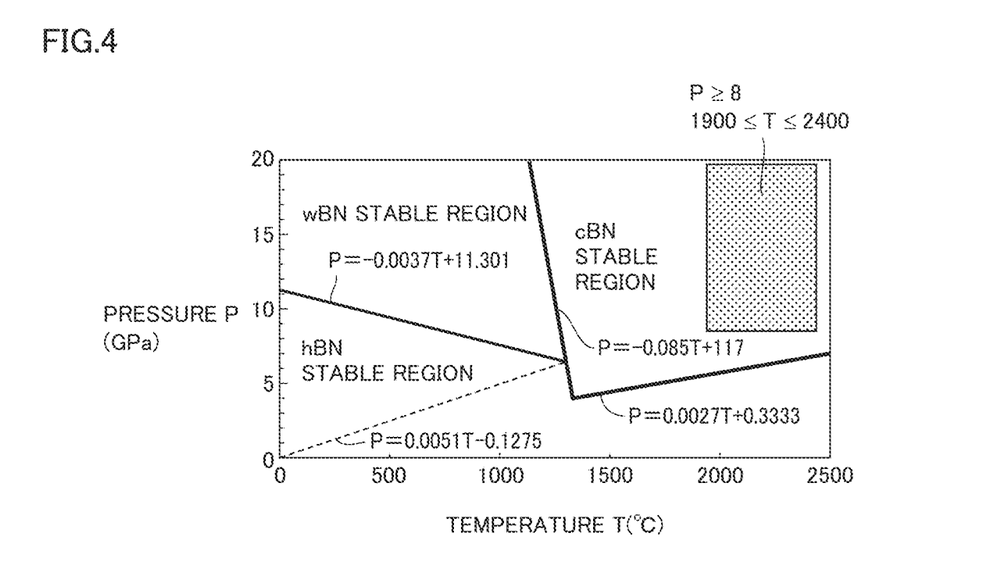
FIG. 4 is a pressure-temperature phase diagram of boron nitride.
Figure 5:
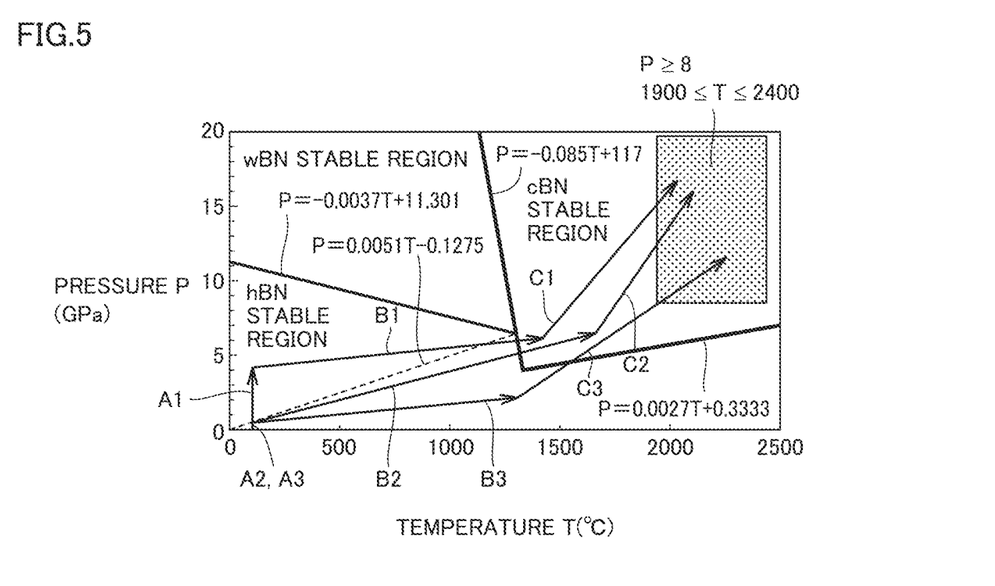
FIG. 5 is a diagram for illustrating a manufacturing process of the polycrystalline cubic boron nitride according to an embodiment of the present disclosure.
Figure 6:
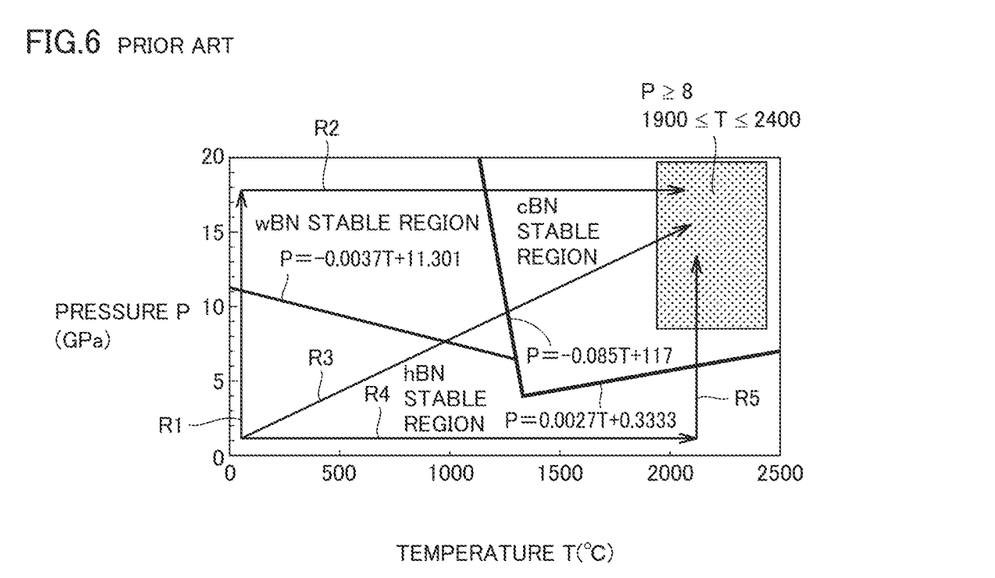
FIG. 6 is a diagram for illustrating a manufacturing process of a conventional polycrystalline cubic boron nitride.

The method for manufacturing a polycrystalline cubic boron nitride according to an embodiment of the present disclosure will be described with reference to FIGS. 4 to 6. FIG. 4 is a pressure-temperature phase diagram of boron nitride. FIG. 5 is a diagram for illustrating a manufacturing process of the polycrystalline cubic boron nitride according to an embodiment of the present disclosure. FIG. 6 is a diagram for illustrating a conventional manufacturing process of a polycrystalline cubic boron nitride.

The method for manufacturing a polycrystalline cubic boron nitride according to the present embodiment is a method for manufacturing the polycrystalline cubic boron nitride described above. The method includes a step of preparing a hexagonal boron nitride powder (hereinafter also referred to as "preparation step"), and a heating and pressurizing step of heating and pressurizing the hexagonal boron nitride powder to a temperature greater than or equal to 1900° C. and less than or equal to 2400° C. and to a pressure greater than or equal to 8 GPa, with the temperature and the pressure not passing through a temperature and a pressure in a stable region of a wurtzite boron nitride (hereinafter also referred to as "heating and pressurizing step"). Here, the temperature and the pressure in the stable region of the wurtzite boron nitride simultaneously satisfy Formulae 1 and 2 shown below wherein T represents the temperature in ° C. and P represents the pressure in GPa.

$$P \geq -0.0037T + 11.301 \qquad \text{Formula 1}$$

$$P \leq -0.085T + 117 \qquad \text{Formula 2}$$

According to the method for manufacturing a polycrystalline cubic boron nitride according to the present embodiment, the hexagonal boron nitride powder is directly converted into the polycrystalline cubic boron nitride without being passed through the temperature and the pressure in the stable region of the wurtzite boron nitride. Therefore, in the obtained polycrystalline cubic boron nitride, generation of coarse grains is suppressed. As a result, in the polycrystalline cubic boron nitride, the homogeneity of the sintered body structure is improved, so that the strength and toughness are improved, and the polycrystalline cubic boron nitride can achieve a long tool life even in high-efficiency processing of difficult-to-cut materials.

The method for manufacturing a polycrystalline cubic boron nitride according to the present embodiment can include a pretreatment step before the heating and pressurizing step, the pretreatment step being a step of pressurizing the hexagonal boron nitride powder to a pressure greater than or equal to 0.5 GPa and less than or equal to 6 GPa at a temperature maintained in a range greater than or equal to −50° C. and less than or equal to 100° C. (hereinafter also referred to as "pretreatment step").

The method for manufacturing a polycrystalline cubic boron nitride according to the present embodiment can include a temperature and pressure holding step after the heating and pressurizing step, the temperature and pressure holding step being a step of holding the polycrystalline cubic boron nitride produced by the heating and pressurizing step under conditions of a temperature greater than or equal to 1900° C. and less than or equal to 2400° C. and a pressure greater than or equal to 8 GPa for greater than or equal to 10 minutes (hereinafter also referred to as "temperature and pressure holding step").

First, prior to a detailed description of the method for manufacturing a polycrystalline cubic boron nitride according to the present embodiment, a method for manufacturing a polycrystalline cubic boron nitride that has been conventionally studied will be described for better understanding.

As shown in FIG. 4, boron nitride has three phases of a hexagonal boron nitride that is a stable phase at normal temperature and normal pressure, a cubic boron nitride that is a stable phase at high temperature and high pressure, and a wurtzite boron nitride that is a metastable phase during the transition from the hexagonal boron nitride to the cubic boron nitride.

The boundary between the phases can be represented by a linear function. In the present description, the temperature and the pressure in the stable region of each phase can be represented by a linear function.

In the present description, the temperature and the pressure in the stable region of the wurtzite boron nitride (shown as "wBN stable region" in FIG. 4) are defined as a temperature and a pressure that simultaneously satisfy Formulae 1 and 2 shown below wherein T represents the temperature in ° C. and P represents the pressure in GPa.

$$P \geq -0.0037T + 11.301 \qquad \text{Formula 1}$$

$$P \leq -0.085T + 117 \qquad \text{Formula 2}$$

In the present description, the temperature and the pressure in the stable region of the hexagonal boron nitride (shown as "hBN stable region" in FIG. 4) are defined as a temperature and a pressure that simultaneously satisfy Formulae (A) and (B) shown below, or simultaneously satisfy Formulae (C) and (D) shown below wherein T represents the temperature in ° C. and P represents the pressure in GPa.

$$P \leq -0.0037T + 11.301 \qquad (A)$$

$$P \leq -0.085T + 117 \qquad (B)$$

$$P \leq 0.0027T + 0.3333 \qquad (C)$$

$$P \geq -0.085T + 117 \quad \text{(D)}$$

In the present description, the temperature and the pressure in the stable region of the cubic boron nitride (shown as "cBN stable region" in FIG. 4) are defined as a temperature and a pressure that simultaneously satisfy Formulae (D) and (E) shown below wherein T represents the temperature in ° C. and P represents the pressure in GPa.

$$P \geq -0.085T + 117 \quad \text{(D)}$$

$$P \geq 0.0027T + 0.3333 \quad \text{(E)}$$

In the present embodiment, the temperature and the pressure reached in the heating and pressurizing step, and the temperature and the pressure held in the temperature and pressure holding step are a temperature greater than or equal to 1900° C. and less than or equal to 2400° C. and a pressure greater than or equal to 8 GPa. At the temperature and the pressure, a cubic boron nitride having excellent tool performance is obtained. That is, in the present embodiment, a target temperature and a target pressure are set at a temperature greater than or equal to 1900° C. and less than or equal to 2400° C. and a pressure greater than or equal to 8 GPa, respectively.

The following three routes have been conventionally studied as temperature and pressure routes for a hexagonal boron nitride to reach the target temperature and the target pressure in the stable region of a cubic boron nitride (see FIG. 6).

First route: From a starting temperature and a starting pressure (normal temperature and normal pressure), the pressure is raised to a target pressure (arrow R1 in FIG. 6), and then the temperature is raised to a target temperature (arrow R2 in FIG. 6).

The first route passes through the stable region of a wurtzite boron nitride. Therefore, the hexagonal boron nitride is converted into the cubic boron nitride after being converted into the wurtzite boron nitride. The hexagonal boron nitride has a layered structure, and the wurtzite boron nitride takes over the structure to form a columnar crystal. The columnar crystal is converted into the cubic boron nitride, so that plate-like grains are produced by the influence of the crystal form of the columnar crystal, and the obtained cubic boron nitride contains coarse grains. Therefore, the cubic boron nitride sometimes causes sudden chipping during processing.

Second route: From the starting temperature and the starting pressure (normal temperature and normal pressure) to the target temperature and the target pressure, heating and pressurizing are performed while the increase amount of the pressure with respect to the increase amount of the temperature is kept constant (arrow R3 in FIG. 6).

In the second route, large initial deformation and the heating proceed simultaneously, so that the quantitative stability is insufficient. Furthermore, when the heating and the pressurizing are performed up to the target temperature and the target pressure at which a cubic boron nitride having excellent tool performance can be obtained while the increase amount of the pressure with respect to the increase amount of the temperature is kept constant, the second route passes through the stable region of the wurtzite boron nitride, and the obtained cubic boron nitride contains coarse grains. Therefore, sudden chipping sometimes occurs during processing.

Third route: From the starting temperature and the starting pressure (normal temperature and normal pressure), the temperature is raised to the target temperature (arrow R4 in FIG. 6), and then the pressure is raised to the target pressure (arrow R5 in FIG. 6).

In the third route, the hexagonal boron nitride is exposed to a high temperature in a low pressure environment, so that the hexagonal boron nitride and the cubic boron nitride are oxidized. Furthermore, the third route is usually not selected from the standpoint of equipment durability.

As described above, a polycrystalline cubic boron nitride containing no coarse grain and excellent in strength and toughness cannot be manufactured by the temperature and pressure routes that have been conventionally studied. In view of this situation, the present inventors have intensively studied pressure and temperature routes. As a result, they found that by treating a hexagonal boron nitride at the temperature and pressure conditions specified in the heating and pressurizing step described above, the generation of coarse grains in a sintered body is suppressed, the strength and toughness are improved, and a cubic polycrystal that can achieve a long tool life even in high-efficiency processing of difficult-to-cut materials can be obtained. The details of the steps of the manufacturing method according to the present embodiment are described below.

<Preparation Step>

A hexagonal boron nitride powder is prepared as a raw material for the polycrystalline cubic boron nitride. The purity of the hexagonal boron nitride powder (content rate of the hexagonal boron nitride) is preferably greater than or equal to 98.5%, more preferably greater than or equal to 99%, and most preferably 100%. The grain size of the hexagonal boron nitride powder is not particularly limited, but may be, for example, greater than or equal to 0.1 μm and less than or equal to 10 μm.

<Pretreatment Step>

Next, the hexagonal boron nitride powder is pressurized to a pressure greater than or equal to 0.5 GPa and less than or equal to 6 GPa (hereinafter referred to as "pretreatment step ultimate pressure") at a temperature maintained in a range greater than or equal to −50° C. and less than or equal to 100° C. using an ultra-high pressure and ultra-high temperature generator (for example, arrows A1, A2, and A3 in FIG. 5).

By performing the pretreatment step, the gap in the hexagonal boron nitride powder can be compressed, and unnecessary gas present in the hexagonal boron nitride powder can be discharged out of the system. Therefore, it is possible to prevent quality degradation due to a chemical reaction between the gas and the hexagonal boron nitride powder.

By performing the pretreatment step, it is possible to increase the density of the hexagonal boron nitride powder to such an extent that the outer shape hardly changes even when the hexagonal boron nitride powder is further pressurized. Since the heating and pressurizing step can be performed in the state, the polycrystalline cubic boron nitride can be manufactured stably.

The temperature in the pretreatment step is preferably maintained in a range greater than or equal to −50° C. and less than or equal to 100° C., and more preferably maintained in a range greater than or equal to 0° C. and less than or equal to 50° C. The pretreatment step ultimate pressure in the pretreatment step is preferably greater than or equal to 0.5 GPa and less than or equal to 5 GPa, and more preferably greater than or equal to 1 GPa and less than or equal to 3 GPa.

In the method for manufacturing a polycrystalline cubic boron nitride according to the present embodiment, the pretreatment step is optional. Therefore, the heating and pressurizing step described below can be performed after the preparation step without performing the pretreatment step.

<Heating and Pressurizing Step>

Next, the hexagonal boron nitride powder is heated and pressurized to a temperature greater than or equal to 1900° C. and less than or equal to 2400° C. (hereinafter also referred to as "ultimate temperature in the heating and pressurizing step") and to a pressure greater than or equal to 8 GPa (hereinafter also referred to as "ultimate pressure in the heating and pressurizing step") without being passed through a temperature and a pressure in the stable region of the wurtzite boron nitride. When the pretreatment step is performed, the hexagonal boron nitride powder after the pretreatment step is heated and pressurized from the ultimate temperature reached at the end of the pretreatment step and the pretreatment step ultimate pressure to a temperature greater than or equal to 1900° C. and less than or equal to 2400° C. and to a pressure greater than or equal to 8 GPa without being passed through a temperature and a pressure in the stable region of the wurtzite boron nitride.

In the heating and pressurizing step, the hexagonal boron nitride in the hexagonal boron nitride powder is directly converted into a cubic boron nitride without being converted into a wurtzite boron nitride. Therefore, in the polycrystalline cubic boron nitride produced by the method according to the present embodiment, the content of the wurtzite boron nitride is reduced. Further, in the heating and pressurizing step according to the present embodiment, since the hexagonal boron nitride is directly phase-changed into the cubic boron nitride, generation of grains having an aspect ratio greater than or equal to 4 due to the hexagonal boron nitride converted through the wurtzite boron nitride can be reduced.

It is preferable that the heating and pressurizing step include a first heating and pressurizing step in which a value of a ratio ΔP1/ΔT1 is constant, the ratio ΔP1/ΔT1 being a ratio between an increase amount ΔT1 of the temperature T and an increase amount ΔP1 of the pressure P for the ΔT1 (for example, arrows B1, B2, and B3 in FIG. 5), and a second heating and pressurizing step in which a value of a ratio ΔP2/ΔT2 is constant, the ratio ΔP2/ΔT2 being a ratio between an increase amount ΔT2 of the temperature T and an increase amount ΔP2 of the pressure P for the ΔT2 (for example, arrows C1, C2, and C3 in FIG. 5), that the first heating and pressurizing step be followed by the second heating and pressurizing step, and that the value ΔP2/ΔT2 be greater than the value ΔP1/ΔT1. According to this method, it is possible to reliably avoid passage of the heating and pressurizing step through the stable region of the wurtzite boron nitride.

For example, as shown by arrow B2 in FIG. 5, it is preferable that the first heating and pressurizing step be performed, until at least a temperature and a pressure that satisfy conditions represented by Formula 3 shown below are reached, at a temperature and a pressure that satisfy conditions represented by Formula 4.

$P=-0.085T+117$     Formula 3

$P<0.0051T-0.1275$     Formula 4

According to this method, it is possible to reliably avoid passage of the heating and pressurizing step through the stable region of the wurtzite boron nitride.

For example, as shown by arrow B3 in FIG. 5, it is preferable that the first heating and pressurizing step be performed at a temperature and a pressure that satisfy conditions represented by Formulae 5 and 6 shown below.

$P<-0.085T+117$     Formula 5

$P<0.0051T-0.1275$     Formula 6

According to this method, it is possible to reliably avoid passage of the heating and pressurizing step through the stable region of the wurtzite boron nitride.

The ultimate temperature in the heating and pressurizing step is preferably greater than or equal to 1900° C. and less than or equal to 2400° C., and more preferably greater than or equal to 2100° C. and less than or equal to 2300° C. The ultimate pressure in the heating and pressurizing step is preferably greater than or equal to 8 GPa and less than or equal to 15 GPa, and more preferably greater than or equal to 9 GPa and less than or equal to 12 GPa.

As described above, a polycrystalline cubic boron nitride can be obtained by subjecting the hexagonal boron nitride powder to the heating and pressurizing step.

<Temperature and Pressure Holding Step>

After the heating and pressurizing step, a step of holding the polycrystalline cubic boron nitride produced by the heating and pressurizing step under conditions of a temperature greater than or equal to 1900° C. and less than or equal to 2400° C. (hereinafter also referred to as "sintering temperature") and a pressure greater than or equal to 8 GPa (hereinafter also referred to as "sintering pressure") for greater than or equal to 10 minutes can be performed. This step can increase the content rate of a cubic boron nitride in the produced polycrystalline cubic boron nitride, and a longer tool life can be achieved.

The sintering temperature in the temperature and pressure holding step is preferably greater than or equal to 1900° C. and less than or equal to 2400° C., and more preferably greater than or equal to 2100° C. and less than or equal to 2300° C. The sintering pressure in the temperature and pressure holding step is preferably greater than or equal to 8 GPa and less than or equal to 15 GPa, and more preferably greater than or equal to 9 GPa and less than or equal to 12 GPa. The sintering time in the temperature and pressure holding step is preferably greater than or equal to 10 minutes and less than or equal to 60 minutes, and more preferably greater than or equal to 10 minutes and less than or equal to 30 minutes.

EXAMPLES

The present embodiment will be described more specifically with reference to examples. However, the present embodiment is not limited to these examples.

[Samples 1 to 20]

In these examples, a relationship was investigated between the conditions for manufacturing a polycrystalline cubic boron nitride, and the constitution (composition, median diameter of the crystal grains, area rate S1 of the crystal grains having an equivalent circle diameter greater than or equal to 1 μm, and area rate S2 of the grains having an aspect ratio greater than or equal to 4), the Vickers hardness, and the performance of the resulting polycrystalline cubic boron nitride.

(Production of Polycrystalline Cubic Boron Nitride)

A polycrystalline cubic boron nitride of each sample was produced according to the following procedure.

First, 6 g of a hexagonal boron nitride powder ("DENKA BORON NITRIDE" (trade name) manufactured by Denka Company Limited, grain size: 5 μm) was prepared. The hexagonal boron nitride powder was put in a capsule made of molybdenum, and pressurized to the pressure described in the column of "Pressure" of "Pretreatment step" in Table 1 at the temperature described in the column of "Temperature" of "Pretreatment step" in Table 1 using an ultra-high pressure and ultra-high temperature generator (pretreatment step). For the samples with a comment "None" in the column of "Pretreatment step" in Table 1, no pretreatment step was performed.

Subsequently, the temperature and the pressure in the ultra-high pressure and ultra-high temperature generator were raised from the ultimate temperature reached at the end of the pretreatment step and the pretreatment step ultimate pressure to the temperature and the pressure described in the columns of "Temperature" and "Pressure" of "First heating and pressurizing step" in Table 1 (first heating and pressurizing step). Subsequently, the temperature and the pressure in the ultra-high pressure and ultra-high temperature generator were raised to the temperature and the pressure described in the columns of "Temperature" and "Pressure" of "Second heating and pressurizing step" in Table 1 (second heating and pressurizing step). For the samples with a comment "None" in the column of "Heating and pressurizing step" in Table 1, no heating and pressurizing step was performed.

In the heating and pressurizing step of each sample, when the temperature and the pressure pass through the temperature and the pressure in the stable region of the wurtzite boron nitride, "Yes" is described in the column of "Passing through wBN stable region" in Table 1, and when the sample did not pass therethrough, "None" is described in the column.

Subsequently, the temperature and the pressure in the ultra-high pressure and ultra-high temperature generator were maintained at the temperature and the pressure described in the columns of "Temperature" and "Pressure" of "Temperature and pressure holding step" in Table 1 for the time described in the column of "Holding time" of "Temperature and pressure holding step" in Table 1 to obtain a polycrystalline cubic boron nitride (temperature and pressure holding step). For the samples with a comment "None" in the column of "Temperature and pressure holding step" in Table 1, no temperature and pressure holding step was performed. The obtained polycrystalline cubic boron nitride was cylindrical.

(Measurement of Composition)

The polycrystalline cubic boron nitride of each sample is cut with a diamond grindstone electrodeposition wire, and the cut surface is taken as an observation surface. An X-ray spectrum of the cut surface of the polycrystalline cubic boron nitride is obtained using an X-ray diffractometer ("MiniFlex600" (trade name) manufactured by Rigaku Corporation). The conditions of the X-ray diffractometer at this time are as follows.

Characteristic X-ray: Cu-Kα (wavelength 1.54 Å)
Tube voltage: 45 kV
Tube current: 40 mA
Filter: Multilayer mirror
Optical system: Focusing method
X-ray diffraction method: θ-2θ method In the obtained X-ray spectrum, the following peak intensity A, peak intensity B, and peak intensity C are measured.

Peak intensity A: The peak intensity of the compressed hexagonal boron nitride excluding the background from the peak intensity near the diffraction angle 2θ=28.5°.

Peak intensity B: The peak intensity of the wurtzite boron nitride excluding the background from the peak intensity near the diffraction angle 2θ=40.8°.

Peak intensity C: The peak intensity of the cubic boron nitride excluding the background from the peak intensity near the diffraction angle 2θ=43.5°.

The content rate of the compressed hexagonal boron nitride is determined by calculating the value of peak intensity A/(peak intensity A+peak intensity B+peak intensity C). The content rate of the wurtzite boron nitride is determined by calculating the value of peak intensity B/(peak intensity A+peak intensity B+peak intensity C). The content rate of the polycrystalline cubic boron nitride is determined by calculating the value of peak intensity C/(peak intensity A+peak intensity B+peak intensity C). Because the compressed hexagonal boron nitride, wurtzite boron nitride, and cubic boron nitride all have almost the same electronic weight, the ratio among the above X-ray peak intensities can be regarded as the volume ratio in the polycrystalline cubic boron nitride.

For all the samples, no component other than cBN, wBN, and compressed hBN was identified. The cBN rate, compressed hBN rate, and wBN rate (% by volume) in each sample are shown in the columns of "cBN rate", "Compressed hBN rate", and "wBN rate" of "Polycrystalline cubic boron nitride" in Table 1, respectively.

(Measurement of Vickers Hardness)

For the polycrystalline cubic boron nitride of each sample, the Vickers hardness Hv was measured by the method described in JIS R 1623 under the conditions of 1000° C. and a load of 1 kg. The results are shown in the column of "Vickers hardness Hv" in Table 1.

(Measurement of Crystal Grains)

For the crystal grains contained in the polycrystalline cubic boron nitride of each sample, the median diameter d50 of the equivalent circle diameter, the area rate of the crystal grains having an equivalent circle diameter greater than or equal to 1 μm, and the area rate of the grains having an aspect ratio greater than or equal to 4 were measured. The specific method is as follows.

The polycrystalline cubic boron nitride was cut using wire electric discharge machining so that five measurement points shown by numbers 1 to 5 in FIG. 7 (the two points near the top and bottom surfaces (the positions shown by numbers 1 and 3), the one point in the central portion (the position shown by number 2), and the two points near the side surface (the positions shown by numbers 4 and 5)) might be exposed, and each cut surface was CP (cross section polisher) processed. Each of the five measurement points on the CP processed surface was observed using a SEM ("JSM-7500F" (trade name) manufactured by JEOL Ltd.) to obtain a SEM image. The size of the measurement visual field was 12 μm×15 μm, and the observation magnification was 10,000 times.

For each of the five SEM images, the distribution of the equivalent circle diameters of the crystal grains, the aspect ratio of each of the crystal grains, and the area of each of the crystal grains were calculated using image processing software (Win Roof ver. 7.4.5) in a state where the crystal grains observed within the measurement visual field were separated from each other at a grain boundary. From the distribution of the equivalent circle diameters of the crystal grains, the median diameter d50 was calculated. From the aspect ratio and the area of each of the crystal grains, the area rate S1 of the crystal grains having an equivalent circle diameter greater than or equal to 1 μm and the area rate S2 of the grains having an aspect ratio greater than or equal to 4 were calculated. The area rate S1, the area rate S2, and the median diameter d50 were calculated using the area of the entire measurement visual field as a denominator.

For each of the five SEM images, the median diameter d50, the area rate S1 of the crystal grains having an equivalent circle diameter greater than or equal to 1 μm, and the area rate S2 of the grains having an aspect ratio greater than or equal to 4 were measured. Based on these measurements, the average values of d50, the area rate S1, and the area rate S2 were calculated. The obtained average values are shown in the columns of "Median diameter d50", "Area rate S1 of crystal grains having equivalent circle diameter greater than or equal to 1 μm", and "Area rate S2 of grains having aspect ratio greater than or equal to 4" in Table 1.

(Cutting Test)

The obtained sintered body was cut with a laser and finished to produce a cutting tool having a tool model number CNGA120408. Using the obtained cutting tool, external turning of a titanium alloy (Ti-6Al-4V) round bar was performed under the following cutting conditions, and the wear resistance was evaluated.

Cutting speed: 250 m/min
Cutting amount: 0.2 mm
Feed amount: 0.1 mm/rev
Cutting oil: Yes The cutting was performed under the above-described cutting conditions, and the processing time until the flank wear amount reached 0.1 mm or the maximum chipping value reached 0.1 mm was measured. It is shown that the longer the processing time is, the better the wear resistance and chipping resistance of the cutting tool are, and the longer the tool life is. The cutting test was performed three times. The results are shown in the column of "Processing time until flank wear or maximum chipping value exceeds 0.1 mm" in Table 1.

TABLE 1

| | Heating and pressurizing step | | | | | | | | | | |
|---|---|---|---|---|---|---|---|---|---|---|---|
| | First heating and pressurizing step | | | | | | Second heating and pressurizing step | | | Temperature and pressure holding step | | |
| Sample No. | Pretreatment step | | Passing through wBN stable region | Pressure | Temperature | ΔP1/ΔT1 | Pressure | Temperature | ΔP2/ΔT2 | Pressure | Temperature | Holding time |
| | Pressure | Temperature | | | | | | | | | | |
| 1 | None | | None | 4 GPa | 1000° C. | 0.004 | 9 GPa | 2100° C. | 0.0055 | None | | |
| 2 | None | | None | 4 GPa | 1200° C. | 0.0033 | 12 GPa | 2300° C. | 0.0073 | None | | |
| 3 | 2 GPa | 25° C. | None | 3 GPa | 1000° C. | 0.001 | 9 GPa | 2100° C. | 0.0058 | None | | |
| 4 | 1 GPa | 50° C. | None | 3 GPa | 1200° C. | 0.0017 | 12 GPa | 2300° C. | 0.0082 | None | | |
| 5 | None | | None | 4 GPa | 1000° C. | 0.004 | 9 GPa | 2100° C. | 0.0055 | 9 GPa | 2200° C. | 30 min |
| 6 | None | | None | 4 GPa | 1200° C. | 0.0033 | 12 GPa | 2300° C. | 0.0073 | 12 GPa | 2400° C. | 10 min |
| 7 | 3 GPa | 25° C. | None | 5 GPa | 1200° C. | 0.0017 | 10 GPa | 2200° C. | 0.005 | 10 GPa | 2200° C. | 20 min |
| 8 | 6 GPa | 50° C. | None | 7 GPa | 1050° C. | 0.001 | 9 GPa | 2000° C. | 0.0021 | 12 GPa | 2300° C. | 30 min |
| 9 | 2 GPa | 50° C. | None | 4 GPa | 1100° C. | 0.0019 | 10 GPa | 2200° C. | 0.0055 | 10 GPa | 2200° C. | 60 min |
| 10 | None | | None | 4 GPa | 1200° C. | 0.0033 | 15 GPa | 2400° C. | 0.0092 | None | | |
| 11 | 8 GPa | 25° C. | Yes | | | None | | | | 10 GPa | 2250° C. | 20 min |
| 12 | 1 GPa | 50° C. | None | 3 GPa | 1200° C. | 0.0017 | 8 GPa | 2500° C. | 0.0038 | 8 GPa | 2500° C. | 15 min |
| 13 | None | | None | 4 GPa | 1200° C. | 0.0033 | 8 GPa | 1800° C. | 0.0067 | 8 GPa | 1800° C. | 30 min |
| 14 | 7 GPa | 25° C. | Yes | 8 GPa | 1000° C. | 0.001 | 12 GPa | 2400° C. | 0.0029 | 12 GPa | 2400° C. | 10 min |
| 15 | 3 GPa | 100° C. | None | 5 GPa | 1200° C. | 0.0018 | 14 GPa | 1800° C. | 0.015 | 14 GPa | 1800° C. | 20 min |
| 16 | None | | Yes | 8 GPa | 1500° C. | 0.0053 | 13 GPa | 1800° C. | 0.017 | None | | |
| 17 | None | | None | 4 GPa | 1100° C. | 0.0036 | 10 GPa | 2300° C. | 0.005 | None | | |
| 18 | None | | None | 4 GPa | 1100° C. | 0.0036 | 7.8 GPa | 2300° C. | 0.0032 | None | | |
| 19 | 5 GPa | 25° C. | None | 5.5 GPa | 1300° C. | 0.0004 | 10 GPa | 2200° C. | 0.005 | None | | |
| 20 | 5 GPa | 25° C. | None | 6 GPa | 1300° C. | 0.0008 | 10 GPa | 2200° C. | 0.0044 | None | | |

| | Polycrystalline cubic boron nitride | | | | | | Processing time (min) until flank wear or maximum chipping value exceeds 0.1 mm | | | |
|---|---|---|---|---|---|---|---|---|---|---|
| Sample No. | cBN rate (% by volume) | Compressed hBN rate (% by volume) | wBN rate (% by volume) | Vickers hardness Hv | Median diameter d50 (μm) | Area rate S1 of crystal grains having equivalent circle diameter greater than or equal to 1 μm (area %) | Area rate S2 of grains having aspect ratio greater than or equal to 4 (area %) | Evaluation 1 | Evaluation 2 | Evaluation 3 | Average |
| 1 | 98.64 | 1.36 | 0 | 49 | 0.21 | 5.2 | 0.9 | 70 | 72 | 69 | 70.3 |
| 2 | 99.02 | 0.98 | 0 | 50 | 0.29 | 6.1 | 1.1 | 72 | 70 | 74 | 72.0 |
| 3 | 99.15 | 0.85 | 0 | 51 | 0.25 | 5.4 | 1.0 | 74 | 74 | 73 | 73.7 |
| 4 | 99.19 | 0.81 | 0 | 52 | 0.28 | 5.9 | 1.1 | 74 | 75 | 76 | 75.0 |
| 5 | 98.88 | 1.12 | 0 | 50 | 0.34 | 6.3 | 0.8 | 71 | 73 | 71 | 71.7 |
| 6 | 99.48 | 0.52 | 0 | 53 | 0.42 | 7.0 | 1.0 | 76 | 77 | 77 | 76.7 |
| 7 | 99.58 | 0.42 | 0 | 54 | 0.23 | 5.3 | 0.7 | 78 | 81 | 80 | 79.7 |
| 8 | 99.62 | 0.38 | 0 | 56 | 0.27 | 5.5 | 0.6 | 82 | 81 | 84 | 82.3 |
| 9 | 99.56 | 0.44 | 0 | 54 | 0.47 | 8.2 | 0.9 | 79 | 81 | 78 | 79.3 |
| 10 | 99.22 | 0.78 | 0 | 53 | 0.41 | 5.1 | 1.2 | 74 | 75 | 72 | 73.7 |
| 11 | 97.53 | 0.53 | 1.94 | 48 | 0.36 | 38.8 | 8.7 | 70 | 21 | 68 | 53.0 |
| 12 | 99.25 | 0.75 | 0 | 45 | 0.67 | 41.9 | 8.1 | 31 | 25 | 36 | 30.7 |
| 13 | 91.71 | 8.29 | 0 | 42 | 0.33 | 4.5 | 0.7 | 32 | 36 | 28 | 32.0 |
| 14 | 97.37 | 0.32 | 2.31 | 47 | 0.44 | 35.2 | 7.2 | 76 | 18 | 49 | 47.7 |

TABLE 1-continued

| 15 | 95.62 | 4.38 | 0    | 43 | 0.12 | 2.19 | 0.4 | 54 | 58 | 53 | 55   |
|----|-------|------|------|----|------|------|-----|----|----|----|------|
| 16 | 98.8  | 1.2  | 0    | 49 | 0.07 | 24.5 | 5.8 | 61 | 44 | 52 | 52.3 |
| 17 | 98.91 | 1.09 | 0    | 49 | 0.31 | 17   | 1.1 | 68 | 65 | 67 | 66.7 |
| 18 | 98.68 | 1.32 | 0    | 49 | 0.32 | 23.5 | 1.1 | 54 | 58 | 55 | 55.7 |
| 19 | 99.19 | 0.61 | 0.20 | 50 | 0.29 | 6.1  | 4.5 | 66 | 63 | 62 | 63.7 |
| 20 | 99.15 | 0.51 | 0.34 | 50 | 0.29 | 6.1  | 5.5 | 58 | 56 | 60 | 58.0 |

(Discussion)

The methods for manufacturing Samples 1 to 10, 17, 19, and 20 include a step of heating and pressurizing the hexagonal boron nitride powder to a temperature greater than or equal to 1900° C. and less than or equal to 2400° C. and to a pressure greater than or equal to 8 GPa, with the temperature and the pressure not passing through a temperature and a pressure in the stable region of the wurtzite boron nitride, and correspond to examples. The polycrystalline cubic boron nitrides of Samples 1 to 10, 17, 19, and 20 contain a cubic boron nitride at a content greater than or equal to 98.5% by volume, have an area rate S1 of the crystal grains, which have an equivalent circle diameter greater than or equal to 1 μm, less than or equal to 20 area %, and correspond to examples. The polycrystalline cubic boron nitrides of Samples 1 to 10, 17, 19, and 20 had a high Vickers hardness, and it was confirmed that when used as a tool, the polycrystalline cubic boron nitrides were capable of stably achieving a long tool life without a variation in the tool life even in high-efficiency processing of difficult-to-cut materials. It was confirmed that Samples 1 to 10, 17 and 19 particularly had an area rate S2 of the grains, which had an aspect ratio greater than or equal to 4, less than or equal to 5 area %, and had a longer tool life.

The methods for manufacturing Samples 11 and 14 include a heating and pressurizing step in which the temperature and the pressure pass through a temperature and a pressure in the wBN stable region, and correspond to comparative examples. The polycrystalline cubic boron nitrides of Samples 11 and 14 contain a cubic boron nitride at a content rate less than 98.5% by volume, have an area rate S1 of the crystal grains, which have an equivalent circle diameter greater than or equal to 1 μm, greater than 20 area %, and correspond to comparative examples. When used as a tool, the polycrystalline cubic boron nitrides of Samples 11 and 14 showed a variation in processing time in the high-efficiency processing of difficult-to-cut materials.

The methods for manufacturing Samples 13 and 15 include a heating and pressurizing step in which the ultimate temperature is 1800° C., and correspond to comparative examples. The cubic boron nitrides of Samples 13 and 15 contain a polycrystalline cubic boron nitride at a content rate less than 98.5% by volume, and correspond to comparative examples. When used as a tool, the polycrystalline cubic boron nitrides of Samples 13 and 15 showed short processing time in the high-efficiency processing of difficult-to-cut materials.

The method for manufacturing Sample 12 includes a step of heating and pressurizing the hexagonal boron nitride powder to a temperature of 2500° C. and to a pressure of 8 GPa, with the temperature and the pressure not passing through a temperature and a pressure in the stable region of the wurtzite boron nitride, and corresponds to a comparative example. The polycrystalline cubic boron nitride of Sample 12 has an area rate S1 of the crystal grains, which have an equivalent circle diameter greater than or equal to 1 μm, greater than 20 area %, and corresponds to a comparative example. When used as a tool, the polycrystalline cubic boron nitride of Sample 12 showed short processing time in the high-efficiency processing of difficult-to-cut materials.

The method for manufacturing Sample 16 includes a heating and pressurizing step in which the temperature and the pressure pass through a temperature and a pressure in the wBN stable region, and corresponds to a comparative example. The polycrystalline cubic boron nitride of Sample 16 has an area rate S1 of the crystal grains, which have an equivalent circle diameter greater than or equal to 1 μm, greater than 20 area %, and corresponds to a comparative example. When used as a tool, the polycrystalline cubic boron nitride of Sample 16 showed short processing time in the high-efficiency processing of difficult-to-cut materials.

The method for manufacturing Sample 18 includes a heating and pressurizing step in which the ultimate pressure is 7.8 GPa, and corresponds to a comparative example. The polycrystalline cubic boron nitride of Sample 18 has an area rate S1 of the crystal grains, which have an equivalent circle diameter greater than or equal to 1 μm, greater than 20 area %, and corresponds to a comparative example. When used as a tool, the polycrystalline cubic boron nitride of Sample 18 showed short processing time in the high-efficiency processing of difficult-to-cut materials.

As described above, the embodiments and examples of the present disclosure have been described. It is also planned from the beginning that the configurations of the above-described embodiments and examples are appropriately combined and variously modified.

The embodiments and examples disclosed herein are illustrative in all respects and should not be construed as being restrictive. The scope of the present invention is shown not by the above-described embodiments and examples but by the claims, and is intended to include all modifications within the scope and meaning equivalent to the claims.

The invention claimed is:

1. A polycrystalline cubic boron nitride comprising a cubic boron nitride at a content greater than or equal to 98.5% by volume,
    the polycrystalline cubic boron nitride having an area ratio S1 of crystal grains, the crystal grains having an equivalent circle diameter greater than or equal to 1 μm, less than or equal to 20 area % at a cross section of the polycrystalline cubic boron nitride as observed with a scanning electron microscope at a magnification of 10,000,
    the crystal grains contained in the polycrystalline cubic boron nitride having a median diameter d50 of the equivalent circle diameter greater than or equal to 0.1 μm and less than or equal to 0.5 μm.

2. The polycrystalline cubic boron nitride according to claim 1, wherein the median diameter d50 is greater than or equal to 0.15 μm and less than or equal to 0.35 μm.

3. The polycrystalline cubic boron nitride according to claim 1, wherein the area ratio S1 is less than or equal to 15 area %.

4. The polycrystalline cubic boron nitride according to claim 3, wherein the area ratio S1 is less than or equal to 10 area %.

5. The polycrystalline cubic boron nitride according to claim 1, having an area ratio S2 of grains, the grains having an aspect ratio greater than or equal to 4, less than or equal to 5 area % at a cross section of the polycrystalline cubic boron nitride as observed with a scanning electron microscope at a magnification of 10,000.

6. The polycrystalline cubic boron nitride according to claim 5, wherein the area ratio S2 is less than or equal to 3 area %.

7. The polycrystalline cubic boron nitride according to claim 1, having a Vickers hardness more than or equal to 49 Hv.

8. A method for manufacturing the polycrystalline cubic boron nitride according to claim 1, the method comprising:
a step of preparing a hexagonal boron nitride powder; and
a heating and pressurizing step of heating and pressurizing the hexagonal boron nitride powder to a temperature greater than or equal to 1900° C. and less than or equal to 2400° C. and to a pressure greater than or equal to 8 GPa, with the temperature and the pressure not passing through a temperature and a pressure in a stable region of a wurtzite boron nitride,
wherein the temperature and the pressure in the stable region of the wurtzite boron nitride simultaneously satisfy Formulae 1 and 2 shown below:

$$P \geq -0.0037T + 11.301 \quad \text{Formula 1; and}$$

$$P \leq -0.085T + 117 \quad \text{Formula 2}$$

wherein T represents the temperature in ° C. and P represents the pressure in GPa,
wherein the heating and pressurizing step includes a first heating and pressurizing step in which a value of a ratio $\Delta P1/\Delta T1$ is constant, the ratio $\Delta P1/\Delta T1$ being a ratio between an increase amount $\Delta T1$ of the temperature T and an increase amount $\Delta P1$ of the pressure P for the $\Delta T1$, and a second heating and pressurizing step in which a value of a ratio $\Delta P2/\Delta T2$ is constant, the ratio $\Delta P2/\Delta T2$ being a ratio between an increase amount $\Delta T2$ of the temperature T and an increase amount $\Delta P2$ of the pressure P for the $\Delta T2$,
the first heating and pressurizing step is followed by the second heating and pressurizing step, and
the value $\Delta P2/\Delta T2$ is greater than the value $\Delta P1/\Delta T1$.

9. The method according to claim 8, comprising a pretreatment step before the heating and pressurizing step, the pretreatment step being a step of pressurizing the hexagonal boron nitride powder to a pressure greater than or equal to 0.5 GPa and less than or equal to 6 GPa at a temperature maintained in a range greater than or equal to −50° C. and less than or equal to 100° C.

10. The method according to claim 8, comprising a temperature and pressure holding step after the heating and pressurizing step, the temperature and pressure holding step being a step of holding the polycrystalline cubic boron nitride produced by the heating and pressurizing step under conditions of a temperature greater than or equal to 1900° C. and less than or equal to 2400° C. and a pressure greater than or equal to 8 GPa for greater than or equal to 10 minutes.

11. The method according to claim 8, wherein the first heating and pressurizing step is performed, until at least a temperature and a pressure that satisfy conditions represented by Formula 3 shown below are reached, at a temperature and a pressure that satisfy conditions represented by Formula 4 shown below:

$$P = -0.085T + 117 \quad \text{Formula 3; and}$$

$$P < 0.0051T - 0.1275 \quad \text{Formula 4.}$$

12. The method according to claim 8, wherein the first heating and pressurizing step is performed at a temperature and a pressure that satisfy conditions represented by Formulae 5 and 6 shown below:

$$P < -0.085T + 117 \quad \text{Formula 5; and}$$

$$P < 0.0051T - 0.1275 \quad \text{Formula 6.}$$

\* \* \* \* \*